(12) United States Patent
Taylor (10) Patent No.: US 10,726,457 B2
(45) Date of Patent: *Jul. 28, 2020

(54) SYSTEMS AND METHODS FOR ESTIMATING VEHICLE DAMAGE

(71) Applicant: Ryan Taylor, Canmore (CA)

(72) Inventor: Ryan Taylor, Canmore (CA)

(*) Notice: Subject to any disclaimer, the term of this patent is extended or adjusted under 35 U.S.C. 154(b) by 57 days.

This patent is subject to a terminal disclaimer.

(21) Appl. No.: 15/968,937

(22) Filed: May 2, 2018

(65) Prior Publication Data

US 2018/0247355 A1 Aug. 30, 2018

Related U.S. Application Data

(63) Continuation of application No. 14/671,660, filed on Mar. 27, 2015, now Pat. No. 9,990,661.

(60) Provisional application No. 61/971,192, filed on Mar. 27, 2014.

(51) Int. Cl.
G06Q 30/06 (2012.01)

(52) U.S. Cl.
CPC .............................. *G06Q 30/0611* (2013.01)

(58) Field of Classification Search
CPC .................................................. G06Q 30/0611
USPC ...................................................... 705/26–27
See application file for complete search history.

(56) References Cited

PUBLICATIONS

"Hartford Fire Insurance Company; Patent Issued for System and Method for Vehicle Repair Cost Estimate Verification (U.S. Pat. No. 10,453,145)." Insurance Weekly News, Nov. 8 2019, p. 179. ProQuest. (Year: 2019).*

* cited by examiner

*Primary Examiner* — Michael Misiaszek
*Assistant Examiner* — Latasha D Ramphal
(74) *Attorney, Agent, or Firm* — Richards Patent Law P.C.

(57) ABSTRACT

The present disclosure systems and methods for providing a repair quote for a car including damage associated with a user. The system is configured to receive information from a user, such as photos of a damaged car, wherein the system generates and/or retrieves the repair quote associated with repairing the damage. As a result, the user does not need to physically take the damaged car to an automobile repair company to retrieve a repair quote.

16 Claims, 6 Drawing Sheets

SYSTEMS AND METHODS FOR ESTIMATING VEHICLE DAMAGE

CROSS-REFERENCE TO RELATED APPLICATIONS

This application is a continuation application of U.S. patent application Ser. No. 14/671,660 filed Mar. 27, 2015, which claims the benefit of priority to U.S. Provisional Application 61/971,192, filed on Mar. 27, 2014, both of which are incorporated by reference.

BACKGROUND OF THE INVENTION

The present subject matter relates generally to systems and methods for providing a repair quote relating to physical damage, such as car or house damage.

Many people, when faced with car damage, fail to bring the car into a repair shop because doing so is very time consuming. Further, many people with car damage would like to obtain more than one quote from various automobile body shops. In order to obtain multiple quotes, the driver must physically go to each body shop to obtain an individual quote. The owner may then compare the quotes and go back to the body shop that is associated with the lowest or most acceptable quote. It is particularly important to bring the vehicle to the shop to ensure the estimator is provided an opportunity to evaluate the full scope of damage.

However, physically going to multiple auto repair shops is too time consuming for most people. As a result, many people may only obtain one quote and agree to the repair work being performed by the first auto repair shop visited. In such case, the customer may not have obtained the best quote and, therefore, may be paying more for the repair than necessary.

Accordingly, there is a need for a convenient and accurate method of providing a repair quote for car damage that provides the estimator with the appropriate detail necessary for an accurate quote.

BRIEF SUMMARY OF THE INVENTION

The present disclosure provides systems and methods for providing a repair quote and systems and methods specifically adapted to collect the visual information required to provide a repair quote. Various examples of the systems and methods are provided herein.

The present disclosure provides a mobile application that instructs the owner to capture specific images of the car damage using the owner's mobile device. The system sends the uploaded photos and description information to the auto repair shop associated with the mobile application. The auto repair shop may then review the submitted information and return an accurate quote for the cost of the repair to the owner.

The system may include prompting the user to upload information about the make and model of the user's car. In an example, the user may upload a photo of the VIN number located on the car. Alternatively, the user may type in the VIN number into the system.

The system may prompt a user to select from a plurality of damage location options. For example, the system may display an image of a car wherein the car is composed of a plurality of panels. The user may select the panel that corresponds to the location on the car that contains the damage.

In addition, the mobile application may prompt a user to upload specific photos of the damaged part of the car. The mobile application may include specific instructions as to the angles and distance from which to take the photo. In an example, as the user is taking the photo of the damage, the system may prompt the user to move the mobile device in order to obtain a suitable photo. For example, the system may display a frame on the screen as the user is taking the photo in order for the user to position the damaged panel within the displayed frame.

The system may generate a repair quote based on the uploaded information. Alternatively, the system may send the uploaded information and photos to an auto body shop associated with the mobile application. The system may then receive a repair quote from the auto body shop and communicate the quote to the user. Alternatively, the auto body shop may communicate the quote directly to the user based on the contact information associated with the user.

In an embodiment, the system includes a controller and a memory coupled to the controller, wherein the memory is configured to store program instructions executable by the controller. In response to executing the program instructions, the controller is configured to receive user information including contact information associated with the user and car information associated with the car. The controller is configured to receive a panel selection, wherein the panel selection corresponds to a portion of the car associated with the damage, and receive at least one photo of a portion of the car associated with the panel selection. In addition, the controller is configured to generate a repair quote associated with the damage and communicate the repair quote to the user based on the contact identification. The repair quote may include a cost estimate and/or time estimate associated with repairing the car.

In an example, the contact information includes an email address associated with the user. The car information may include the vehicle identification number associated with the car. In an example, the car information includes a photo of a vehicle identification number associated with the car.

The controller may be further configured to communicate the user information, the car information, and the at least one photo to an automobile repair company, wherein the repair quote is generated by an automobile repair company. In addition, the controller may communicate the repair quote to the user from an automobile repair company.

In an example, the controller is further configured to display on the user interface, a plurality of panel selection options. The panel selection options may include a left front fender, a left front door, a left rear door, a left quarter panel, a left rear fender, a right front fender, a right front door, a right rear door, a right quarter panel, and a right rear fender.

The controller may be configured to display photo instructions on the user interface. In an example, the photo instructions may include an example photo of the selected panel. The controller may be configured to receive at least two photos of the selected panel, wherein the at least two photos capture an image of the damage at least two different angles.

An advantage of the present system and method is providing a repair quote to a user without the user needing to physically bring the damaged car to the auto repair shop.

A further advantage of the present invention is ensuring accurate and appropriate photos of the damaged sections of the car are submitted to generate an accurate repair quote.

Another advantage of the present systems and methods is allowing a user to receive separate repair quotes from various auto repair companies. Further, the received quotes are not disclosed to the other repair companies that are also bidding. As a result, the repair companies are not forced to compete with each other to drive down the price and quality of the repair.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1A:
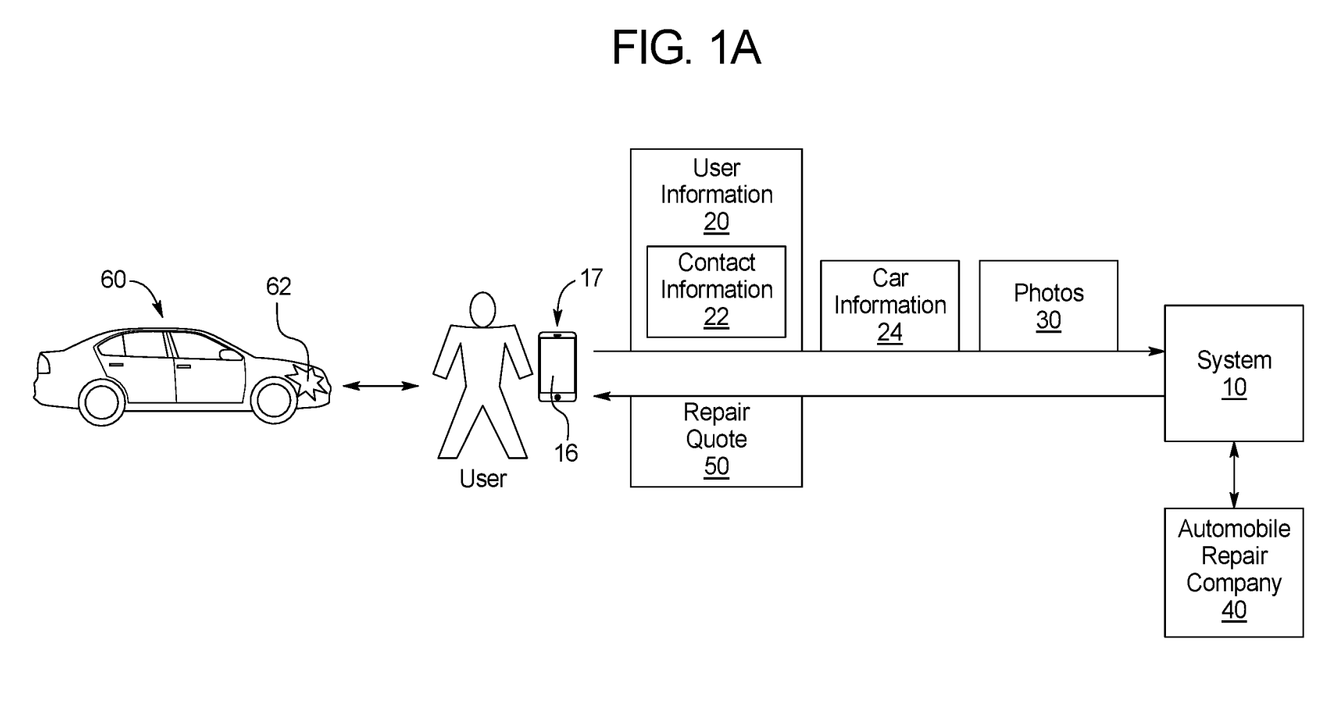
FIG. 1A is a schematic of an embodiment of the system disclosed herein interacting with a user associated with a damaged car.

As shown in FIG. 1A, the present system 10 is directed to a mobile application for providing a repair quote 50 for a car 60 including damage 62 associated with a user. The system 10 is configured to receive information from a user, such as photos of a damaged car, wherein the system 10 generates, retrieves, or otherwise provides the repair quote 50 associated with repairing the damage 62 to the user. As a result, the user does not need to physically take the damaged car 60 to an automobile repair company 40 to retrieve a repair quote 50.

Figure 1B:
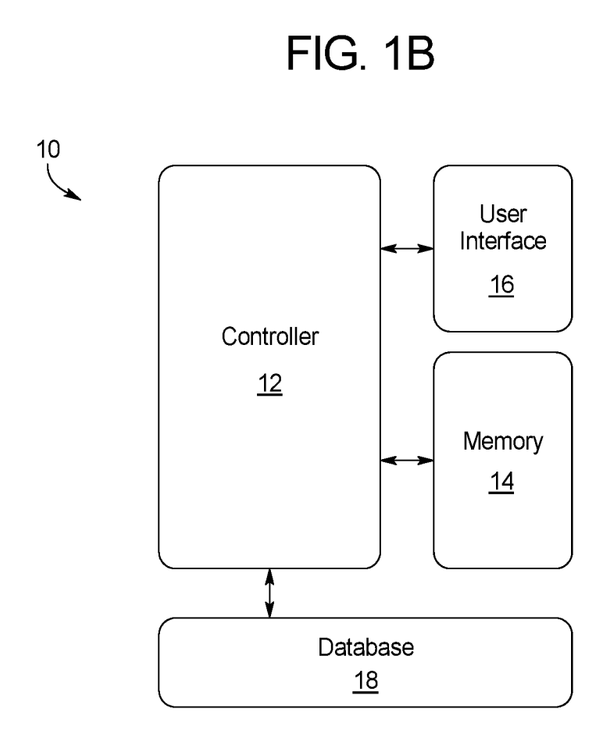
FIG. 1B is a schematic of an embodiment of the system disclosed herein.
Figure 2:
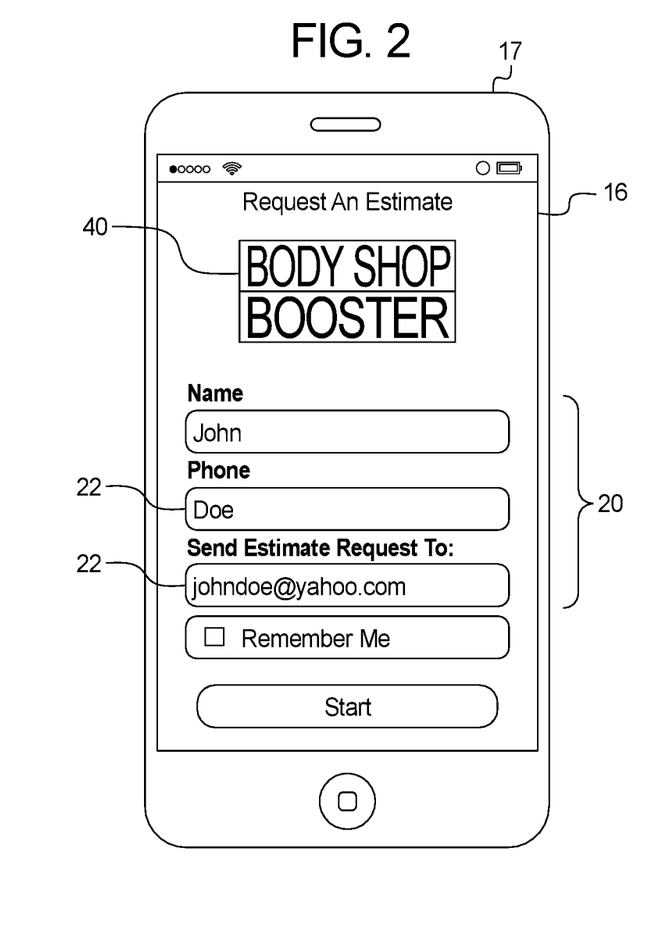
FIG. 2 is a schematic of an embodiment of a user interface displaying various user input prompts for user information.

As shown in FIG. 1B, the system 10 includes a controller 12 and a memory 14 coupled to the controller 12, wherein the memory 14 is configured to store program instructions executable by the controller 12. In response to the instructions, the controller 12 is configured to receive user information 20 from a user interface 16 associated with a mobile device 17. As shown in FIG. 2, the user information 20 may include the user's name or identification along with various contact information 22. For example, the contact information 22 may include the user's email address, phone number, social media contact, address, among others.

Figure 3:
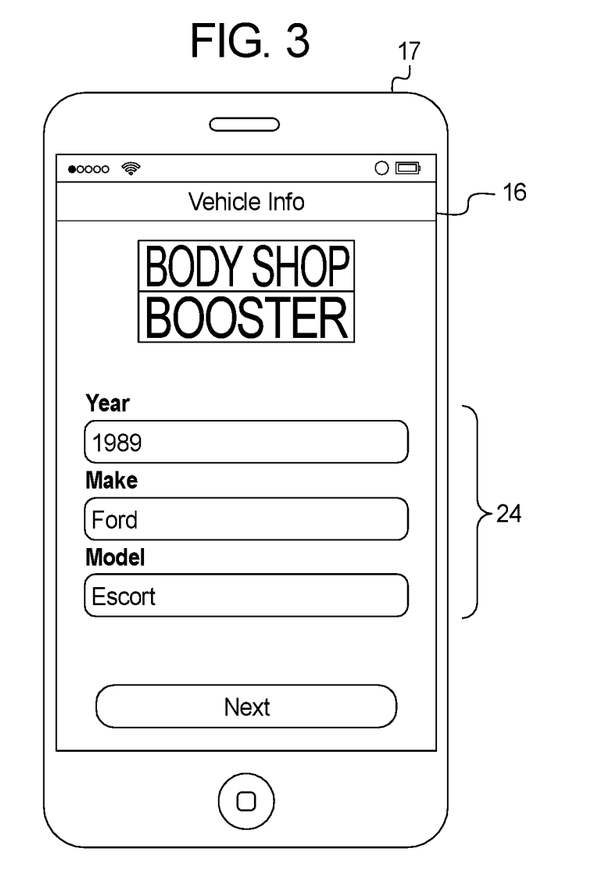
FIG. 3 is a schematic of an embodiment of a user interface displaying various user input prompts for automobile information.

The controller 12 is also configured to receive car information 24 associated with the damaged car 60. As shown in FIG. 3, the car information 24 may include the year of the car along with the make and model. For example, the user may submit that the car 60 is a 1989 Ford Escort. The car information 24 may include the vehicle identification number. In an example, the car information 24 may be a photo of the vehicle identification number physically located within the car 60.

Figure 4A:
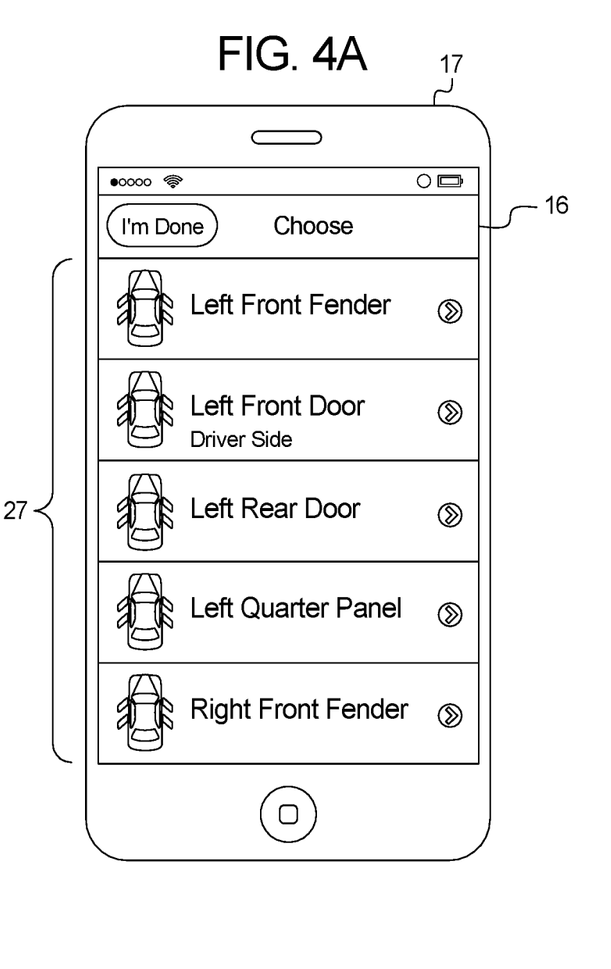
FIG. 4A is a schematic of an embodiment of a user interface displaying a plurality of panels for a user to chose from, wherein the selected panel corresponds to the panel on the automobile having damage.
Figure 4B:
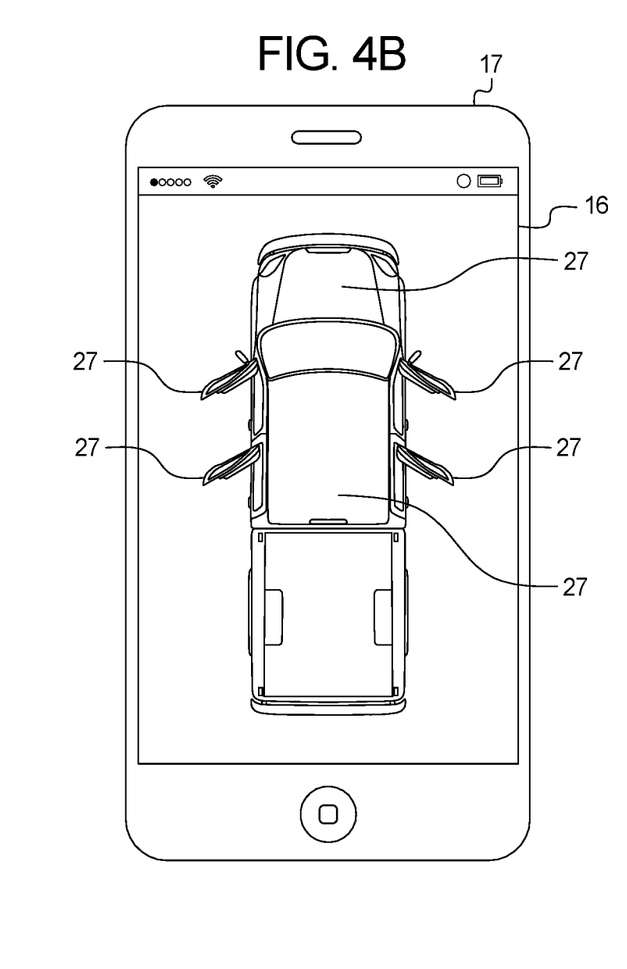
FIG. 4B is a schematic of another embodiment of a user interface displaying a plurality of panels for a user to chose from, wherein the selected panel corresponds to the panel on the automobile having damage.

The controller 12 is also configured to receive a panel selection 26 from the user, wherein the panel selection 26 corresponds to a portion of the car 60 associated with a location on the car 60 of the damage 62. As shown in FIG. 4A, the controller 12 is configured to display on the user interface 16, a plurality of panel selection options 27. The panel selection options 27 may include a left front fender, a left front door, a left rear door, a left quarter panel, a left rear fender, a right front fender, a right front door, a right rear door, a right quarter panel, and a right rear fender. Alternatively, FIG. 4B is another example of is a user interface displaying a plurality of panels for a user to chose from, wherein the display includes a schematic of a car including the plurality of panel selection options 27. In such example, the user may select the panel selection 26 by tapping on the panel in the image that corresponds to the panel on the automobile having damage. Of course, it is contemplated that the car 60 may be divided into any number of suitable panels. For example, the panel selection 26 may include right side, left side, front, back, hood, and trunk.

In one contemplated embodiment, the system 10 may require the input of one or more photos 30 for each of the plurality of the panel selection options 27. For example, the submission of the information for evaluation may be prevented until the appropriate quantity (and quality) of photos is taken for each of the panel selection options 27. Accordingly, there may be an indication through the user interface 16 that identifies whether the requirements for each of the panel selection options 27 has been met, such as, for example, the panel associated with each of the panel selection options 27 may turn from red to green when the requirements are met. As a result, the user is walked through the data acquisition process in a manner that ensures the appropriately complete scope of photos 30 have been acquired. The quality of images may similarly be controlled, as described below.

Figure 5A:
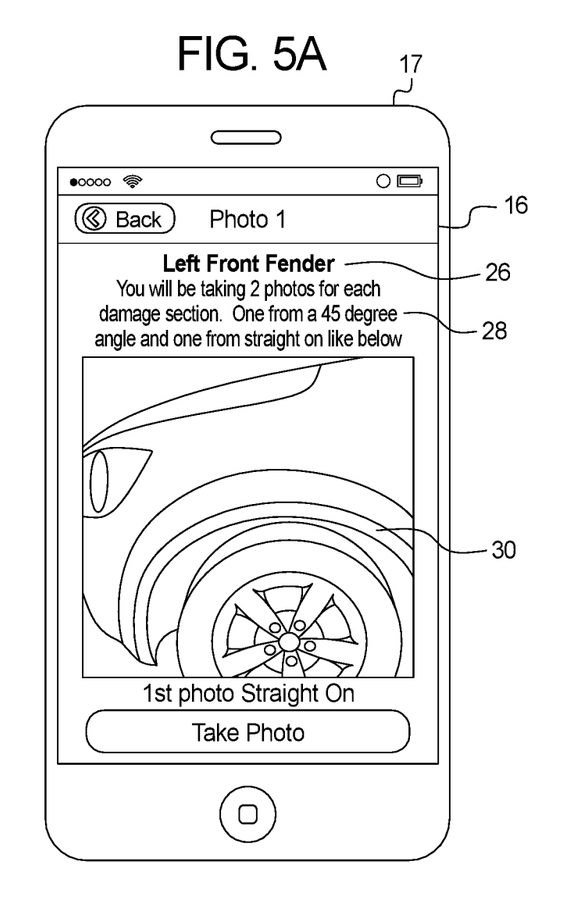
FIGS. 5A-5B is a schematic of an embodiment of a user interface displaying instructions and prompts for a user to obtain photos of the damage.
Figure 5B:
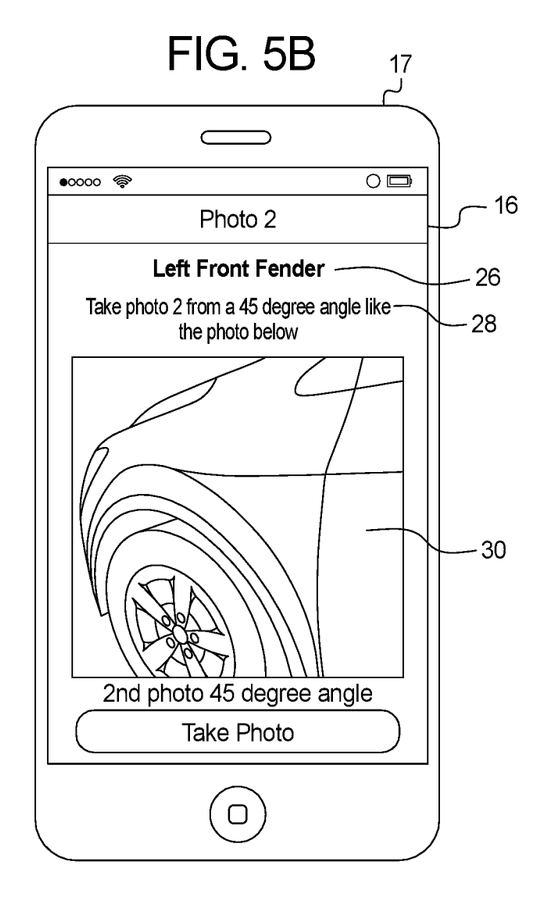

As shown in FIG. 5, the controller 12 may also be configured to display photo instructions 28 on the user interface 16. The photo instructions 28 may include text and/or an example photo of the panel selection 26. The instructions may include the distance, height, and angle of the panel at which the user should take the photo. Providing clear, concise, and specific directions adapted to generate images of the quality necessary to assess the damage is critical to the successful operation by an otherwise untrained user.

In addition, the system 10 may include dynamic instructions or prompts while the user is taking the photo 30. For example, as the user is pointing a camera associated with the mobile device 17 at the portion of the car 60 associated with the panel selection 26, the controller 12 may instruct the user to move in space before the user takes the photo 30. For example, if the user holding the mobile device 17 is too close to the portion of the car 60 associated with the selected panel 26, the controller 12 may instruct the user to increase the distance between the camera and the car 60. In addition, the controller 12 may communicate a confirmation when the user is positioned in the correct place to obtain a photo 30 at a proper angle. In other words, the user may continue to move the mobile device 17 until the confirmation is received before taking the photo 30. For example, confirmation may include a sound and/or visual indication, such as a green light that indicates the user should now capture the image by taking the photo 30.

The dynamic instructions may be provided in response to the system 10 comparative analysis of representative sample images stored in the memory 14 or the database 18 to determine whether the photo 30 to be taken falls within parameters established to define an image of appropriate quality. Such parameters may include photo characteristics such as lighting (e.g., comparing the brightness, contrast, exposure, etc. in the photo 30 to be taken against a range of lighting characteristics that represent photos 30 taken under the appropriate conditions), scale of elements within the photo 30 (e.g., comparing the size of a tire in the photo 30 to be taken against a range of tire sizes that represent photos 30 taken at the appropriate scale), angles, etc.

The user may upload or otherwise send the photo 30 of the portion of the car 60 associated with the panel selection 26 to the controller 12. HDR imaging may be used to obtain the photo 30. For example, the photo 30 may be a composition of a plurality of exposures including various thermal and exposure levels.

In an example, the controller 12 is configured to receive at least two photos 30 for each panel selection 26, wherein the at least two photos 30 capture images of the damage 62 from at least two different angles. For example, in FIG. 5A, the controller 12 instructs the user to obtain a direct (straight on) photo 30 of the portion of the car 60 associated with the panel selection 26. In FIG. 5B, the controller 12 instructs the user to obtain a photo 30 at a 45 degree angle. Requiring photos 30 at multiple angles for each panel selection 26 may be critical to appropriately evaluating any three-dimensional component of the damage to assess.

Figure 6:
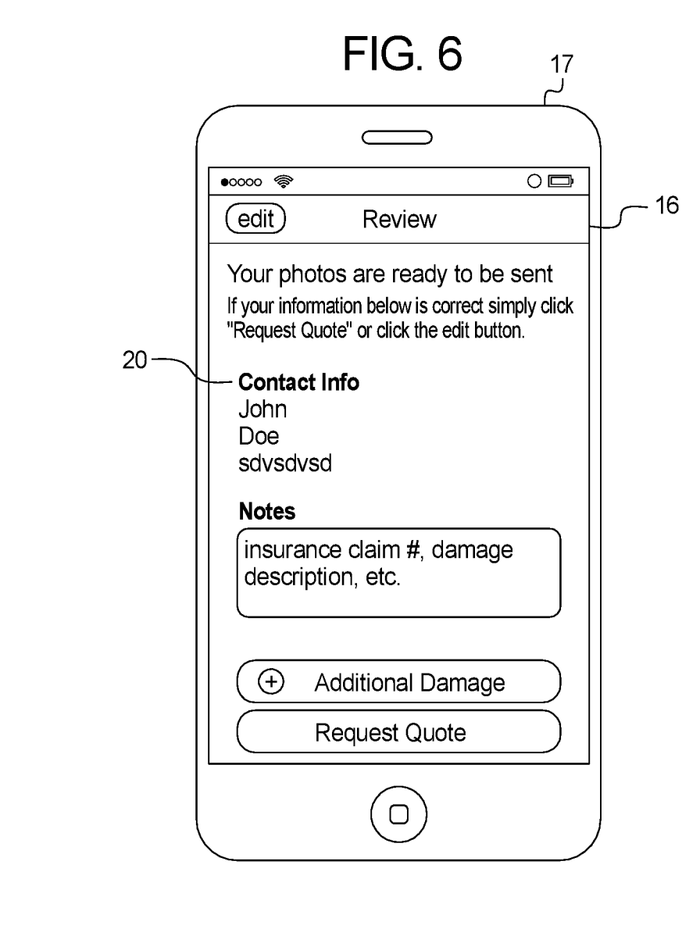
FIG. 6 is a schematic of an embodiment of a user interface displaying a prompt for the user to confirm the uploaded information.
Figure 7:
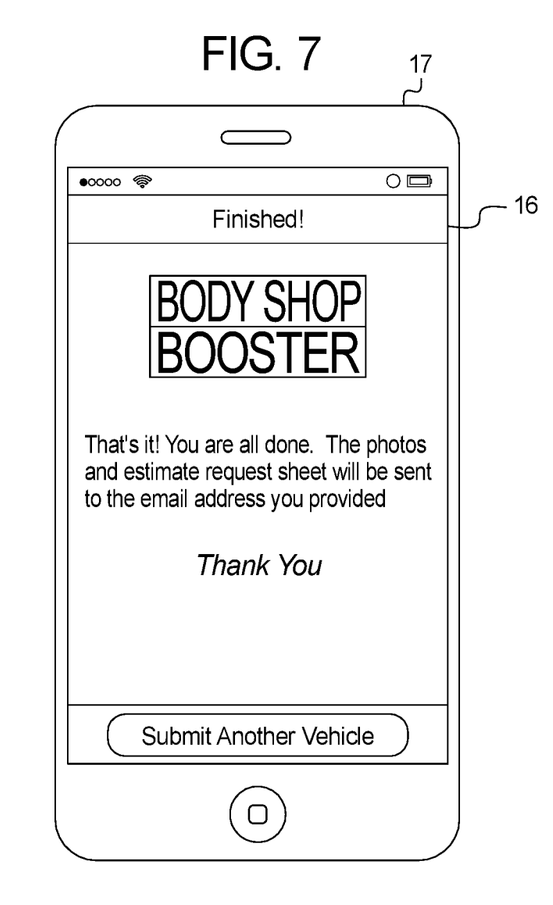
FIG. 7 is a schematic of an embodiment of a user interface displaying a confirmation that the system has sent the uploaded information to the associated auto body shop.

As shown in FIG. 6, the system 10 may display a summary of the information obtained and a prompt to receive further comments. The user may insert additional instructions or requests relating to the repair quote 50. For example, the user may request the repair quote 50 to be delivered in one business day. In another example, the user may add notes relating to the damage 62. As shown, the user may submit to request a repair quote 50. Alternatively, the user may add additional damage 62 on the car 60. For example, the user may need a repair quote 50 for two or more portions of the car 60. Therefore, the user may submit additional information to a second portion of the car with damage 62. The system 10 may display a confirmation after all the information associated with the damage 62 has been uploaded or entered into the system 10.

The controller 12 is further configured to generate a repair quote 50 associated with the damage 62. The repair quote 50 may include a cost estimate associated with repairing the damage 62. When the user has entered in more than one damage 62, the cost estimate may be separated by portions of the car 60 associated with each damage 62. The repair quote 50 may also include a time estimate associated with repairing the damage 62. The repair quote 50 may also include further comments or text related to the repair. For example, the comments may include an explanation of the repair quote 50 or questions related to the damage 62. In an example, the system 10 enables a user to respond to the questions or communicate with an automobile repair company 40.

The controller 12 may be further configured to communicate the user information 20, the car information 23, and the at least one photo 30 to an automobile repair company 40, wherein the repair quote 50 is generated by an automobile repair company 40.

The controller 12 is also configured to communicate the repair quote 50 to the user, typically using the contact information 22. In an example, the repair quote 50 is communicated to the user from an automobile repair company 40. The repair quote 50 may be sent through the mobile application, wherein a user receives a notification that a repair quote 50 is ready for viewing by the user within the mobile application.

The controller 12 may also be configured to receive input from the user relating to whether the user is planning on paying for the repairs herself, and not filing an insurance claim. Alternatively, the user may select an option indicating that the user has contacted her insurance company and has a claim number. The system 10 may take such input into account when generating a repair quote 50.

As mentioned above and schematically shown in FIG. 1B, aspects of the systems and methods described herein are controlled by one or more controllers 12. The one or more controllers 12 may be adapted to run a variety of application programs, access and store data, including accessing and storing data in the associated databases 16, and enable one or more interactions as described herein. Typically, the controller 12 is implemented by one or more programmable data processing devices. The hardware elements, operating systems, and programming languages of such devices are conventional in nature, and it is presumed that those skilled in the art are adequately familiar therewith.

For example, the one or more controllers 12 may be a PC based implementation of a central control processing system utilizing a central processing unit (CPU), memory 14 and an interconnect bus. The CPU may contain a single microprocessor, or it may contain a plurality of microprocessors for configuring the CPU as a multi-processor system. The memory 14 may include a main memory, such as a dynamic random access memory (DRAM) and cache, as well as a read only memory, such as a PROM, EPROM, FLASH-EPROM, or the like. The system may also include any form of volatile or non-volatile memory 14. In operation, the memory 14 stores at least portions of instructions for execution by the CPU and data for processing in accord with the executed instructions.

The one or more controllers 12 may also include one or more input/output interfaces for communications with one or more processing systems. Although not shown, one or more such interfaces may enable communications via a network, e.g., to enable sending and receiving instructions electronically. The communication links may be wired or wireless.

The one or more controllers 12 may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces 30 for the controller 12. For example, the one or more controllers 12 may include a graphics subsystem to drive the output mechanism. The links of the peripherals to the system may be wired connections or use wireless communications.

Although summarized above as a PC-type implementation, those skilled in the art will recognize that the one or more controllers 12 also encompasses systems such as host computers, servers, workstations, network terminals, and the like. Further one or more controllers 12 may be embodied in a device, such as a mobile electronic device, like a smartphone or tablet computer. In fact, the use of the term controller 12 is intended to represent a broad category of components that are well known in the art.

Hence aspects of the systems and methods provided herein encompass hardware and software for controlling the relevant functions. Software may take the form of code or executable instructions for causing a controller 12 or other programmable equipment to perform the relevant steps, where the code or instructions are carried by or otherwise embodied in a medium readable by the controller 12 or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory 14 of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller 12 can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

I claim:

1. A system for providing a repair quote for a car including damage to a user, wherein the system comprises:
   a controller;
   a memory coupled to the controller, wherein the memory is configured to store program instructions executable by the controller;
   wherein in response to executing the program instructions, the controller is configured to:
   receive a panel selection, wherein the panel selection corresponds to a portion of the car associated with the damage;
   display photo instructions on a user interface, wherein the photo instructions are dynamic instructions communicated while the user is positioning a camera in space, wherein the photo instructions direct the user to position the camera in space until the camera is in a correct position to obtain a photo;
   wherein prior to communicating a confirmation to indicate the camera is in the correct position, perform a comparative analysis between a sample image stored in the memory and the photo to be taken;
   determine whether the position of the camera is correct to obtain the photo that falls within parameters established to define an image of appropriate quality; and
   wherein upon the user achieving the correct position, communicating the confirmation prior to the user taking the photo to indicate the user is in the correct position.

2. The system of claim 1, wherein the controller is configured to receive user information including contact information associated with the user, wherein the contact information includes an email address associated with the user.

3. The system of claim 1, wherein the controller is configured to receive car information associated with the car, wherein the car information includes a vehicle identification number associated with the car.

4. The system of claim 3, wherein the car information includes a photo of the vehicle identification number associated with the car.

5. The system of claim 1, wherein the controller is further configured to communicate the at least one photo to an automobile repair company, wherein the controller is configured to receive a repair quote generated by the automobile repair company.

6. The system of claim 5, wherein the controller is further configured to communicate the repair quote to the user from then automobile repair company.

7. The system of claim 5, wherein the repair quote includes a cost estimate associated with repairing the damage.

8. The system of claim 5, wherein the repair quote includes a time estimate associated with repairing the damage.

9. The system of claim 1, wherein the controller is further configured to display on the user interface, a plurality of panel selection options.

10. The system of claim 9, wherein the panel selection options include a left front fender, a left front door, a left rear door, a left quarter panel, a left rear fender, a right front fender, a right front door, a right rear door, a right quarter panel, and a right rear fender.

11. The system of claim 1, wherein the photo instructions include an example photo of the selected panel.

12. The system of claim 1, wherein the controller is configured to receive at least two photos of the selected panel, wherein the at least two photos capture an image of the damage at least two different angles.

13. The system of claim 1, wherein the confirmation includes a visual indication.

14. The system of claim 1, wherein the confirmation includes an audio indication.

15. The system of claim 1, wherein prior to communicating a confirmation to indicate the user is in the correct position, the controller is further configured to
   perform a comparative analysis between a sample image stored in the memory and a photo to be taken; and
   determine whether the position the camera in space is in a correct position to obtain a photo that falls within parameters established to define an image of appropriate quality.

16. The system of claim 15, wherein the parameters established to define an image of appropriate quality include at least one of size, brightness, contrast, exposure, and combinations thereof.

* * * * *